US012608696B2

(12) United States Patent
Mistkawi

(10) Patent No.: US 12,608,696 B2
(45) Date of Patent: Apr. 21, 2026

(54) HEAT MANAGEMENT SYSTEM FOR TOP-DOWN READER OF A FIXED RETAIL SCANNER AND RELATED METHODS

(71) Applicant: Datalogic IPTech S.R.L., Bologna (IT)

(72) Inventor: Joseph Mistkawi, Tigard, OR (US)

(73) Assignee: DATALOGIC IP TECH S.R.L., Bologna (IT)

( * ) Notice: Subject to any disclaimer, the term of this patent is extended or adjusted under 35 U.S.C. 154(b) by 456 days.

(21) Appl. No.: 18/081,624

(22) Filed: Dec. 14, 2022

(65) Prior Publication Data

US 2023/0230060 A1      Jul. 20, 2023

Related U.S. Application Data

(60) Provisional application No. 63/299,901, filed on Jan. 14, 2022.

(51) Int. Cl.
*G06Q 20/20*         (2012.01)
*G06K 7/14*          (2006.01)

(52) U.S. Cl.
CPC ......... *G06Q 20/208* (2013.01); *G06K 7/1413* (2013.01); *G06K 7/1417* (2013.01)

(58) Field of Classification Search
CPC .. G06Q 20/208; G06K 7/1413; G06K 7/1417; G07G 1/0018
See application file for complete search history.

(56) References Cited

U.S. PATENT DOCUMENTS

| | | | |
|---|---|---|---|
| 5,814,802 A | 9/1998 | Hecht et al. | |
| 6,871,993 B2 | 3/2005 | Hecht | |
| 8,233,040 B2 | 7/2012 | Patel et al. | |
| 8,430,318 B2 | 4/2013 | Mcqueen et al. | |
| 9,004,359 B2 | 4/2015 | Shearin et al. | |
| 9,305,198 B2 | 4/2016 | Thompson et al. | |
| 9,413,418 B2 | 8/2016 | Bottazzi et al. | |
| 9,870,498 B2 | 1/2018 | Reynolds et al. | |
| 10,049,247 B2 | 8/2018 | Gao | |
| 10,161,742 B2 | 12/2018 | Patel et al. | |
| 10,248,896 B2 | 4/2019 | Gao et al. | |
| 2002/0097558 A1 | 7/2002 | Stone et al. | |
| 2003/0001010 A1 | 1/2003 | Schmidt et al. | |
| 2008/0182639 A1 | 7/2008 | Antonopoulos et al. | |
| 2010/0139989 A1 | 6/2010 | Atwater et al. | |

(Continued)

OTHER PUBLICATIONS

International PCT Patent Application No. PCT/US2022/052882, International Search Report and Written Opinion dated Mar. 8, 2023, 11 pgs.

*Primary Examiner* — Matthew Mikels

(74) *Attorney, Agent, or Firm* — Foley & Lardner LLP

(57) ABSTRACT

The disclosure includes a fixed retail scanner including a scanner base unit comprising one or more imagers to view a read zone, and a top-down reader having a head and an elongate stand operably coupled to the scanner base unit. The top-down reader includes a printed circuit board including one or more processors and optical components disposed within the head of the top-down reader, and a heat management system including a heat pipe having a first end disposed within the head and extending into a sealed air chamber within the stand to dissipate heat from the one or more processors into the sealed air chamber. Related methods for heat management of a top-down reader are also disclosed.

18 Claims, 6 Drawing Sheets

(56)                References Cited

U.S. PATENT DOCUMENTS

| 2013/0306727 | A1* | 11/2013 | Shearin | .................... | G06K 7/10 |
| | | | | | 235/440 |
| 2014/0118920 | A1 | 5/2014 | Ng et al. | | |
| 2017/0337406 | A1* | 11/2017 | Reynolds | ........... | G06K 7/10792 |
| 2017/0374768 | A1 | 12/2017 | Hughes et al. | | |
| 2018/0301269 | A1 | 10/2018 | Sundaram | | |
| 2020/0125812 | A1 | 4/2020 | Canini et al. | | |

* cited by examiner

HEAT MANAGEMENT SYSTEM FOR TOP-DOWN READER OF A FIXED RETAIL SCANNER AND RELATED METHODS

PRIOR APPLICATIONS

This application claims the benefit of U.S. Provisional Application No. 63/299,901, filed Jan. 14, 2022, and entitled "HEAT MANAGEMENT SYSTEM FOR TOP-DOWN READER OF A FIXED RETAIL SCANNER AND RELATED METHODS," the disclosure of which is incorporated by reference herein in its entirety.

RELATED APPLICATION

This application is also related to U.S. patent Ser. No. 18/081,621 filed Dec. 14, 2022, filed on the same day as the present application, which claims priority to U.S. Provisional Patent Application Ser. No. 63/293,565, filed Dec. 23, 2021, and entitled "FIXED RETAIL SCANNER HEAT MANAGEMENT SYSTEM FOR MULTI-PORT NETWORK SWITCH AND RELATED METHODS," the disclosure of which is incorporated herein by reference in its entirety.

TECHNICAL FIELD

The present disclosure relates generally to scanners or code readers, and more particularly, to providing heat management for a top-down reader of a fixed retail scanner.

BACKGROUND

Data reading devices are used to read optical codes, acquire data, and capture a variety of images. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes. Data reading devices are well known for reading UPC and other types of optical codes on packages, particularly in retail stores. One common data reader in such systems is an imaging reader that employs an imaging device or sensor array, such as a CCD (charge coupled device) or CMOS (complementary metal oxide semiconductor) device. Imaging readers can be configured to read both one-dimensional (1-D) and two-dimensional (2-D) optical codes, as well as other types of optical codes or symbols and images of other items.

BRIEF SUMMARY

A fixed retail scanner may include a scanner base unit including one or more imagers to view a read zone, and a top-down reader having a head and an elongate stand operably coupled to the scanner base unit. The top-down reader includes a printed circuit board including one or more processors and optical components disposed within the head of the top-down reader, and a heat management system including a heat pipe having a first end disposed within the head and extending into a sealed air chamber within the stand to dissipate heat from the one or more processors into the sealed air chamber.

A top-down reader for a fixed retail scanner may include a head region having an optical cavity area including one or more processors and optical components for capturing images of objects within its field-of-view, an elongate stand region providing a support for the head region and accommodating one or more cables for coupling to a base scanner unit of the fixed retail scanner, and a heat pipe thermally coupled to the one or more processors within the head region, the heat pipe extending into a sealed air chamber formed within elongate stand region.

A method for providing heat management of top-down reader for a fixed retail scanner may include (i) drawing heat away from a processor disposed within an optical cavity of a head region of the top-down reader via a heat pipe extending into a sealed air chamber within an elongate stand region of the top-down reader, and (ii) creating an air flow through the air chamber.

DETAILED DESCRIPTION

Figure 1:
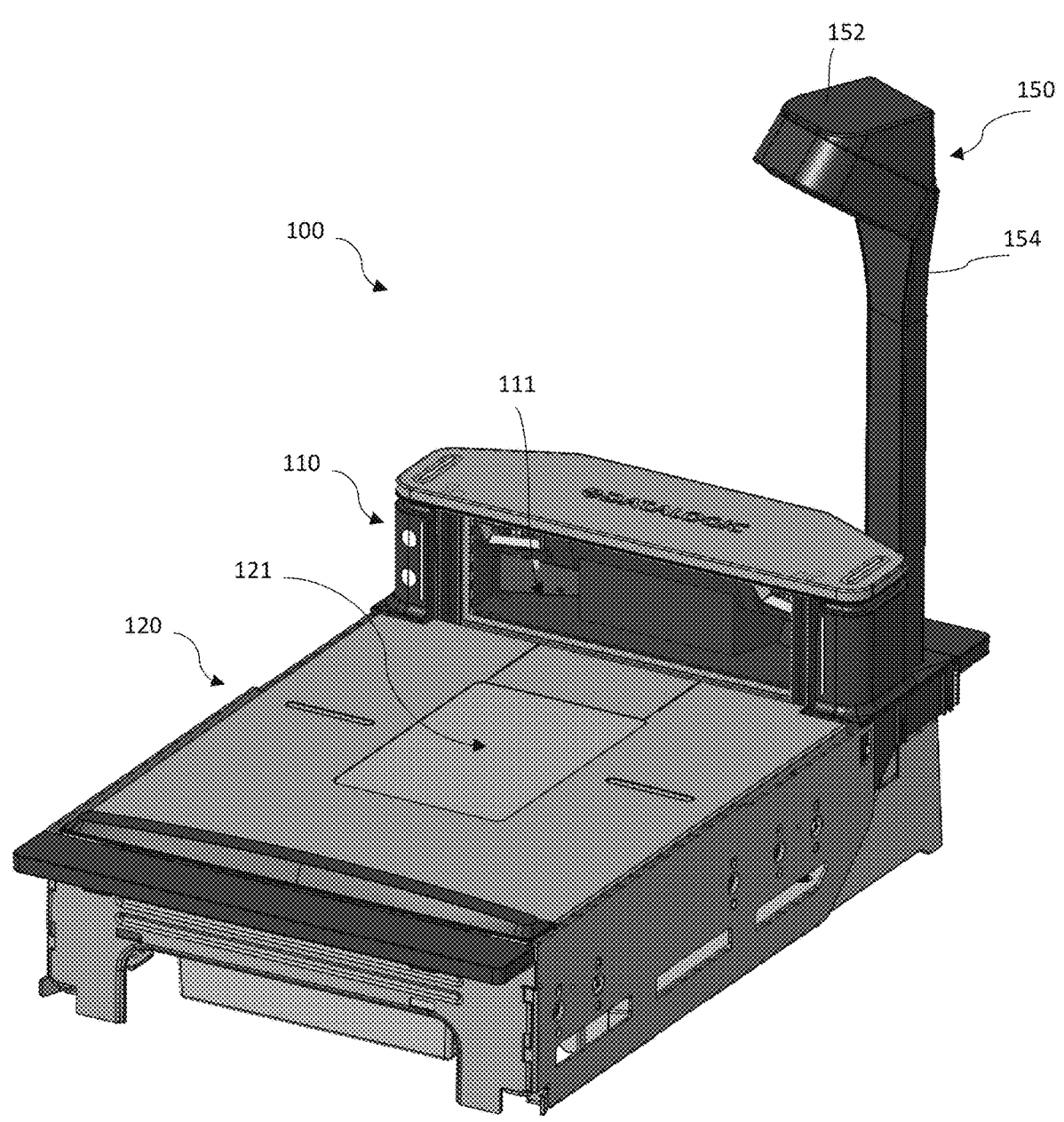
FIG. 1 is a perspective view of a data reader according to an embodiment of the disclosure.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

"Image data" as used herein includes both individual frames as well as multiple frames (e.g., streaming video). Image data may be captured by one or more imagers positioned at various within the housing of the fixed retail scanner, such as in a horizontal base unit or a vertical bonnet of a bi-optic scanner having imagers positioned in two different planes. Single plane scanners (e.g., horizontal or vertical only housings) are also contemplated and within the scope of the disclosure. Image data may also be captured by one or more imagers positioned external to the primary scanning unit, such as peripheral devices (e.g., top down reader imagers, security imagers, bottom of basket readers, etc.) that may also provide image data to the fixed retail scanner and/or remote systems.

FIG. 1 is a perspective view of a data reader 100 according to an embodiment of the disclosure. The data reader 100 may be a bi-optic fixed retail scanner having a vertical housing 110 and a horizontal housing 120. The vertical housing 110 may include a structure that provides for one or more camera fields-of-view (through a vertical window 111) within a generally vertical plane across the read zone of the data reader 100. The vertical structure provides an enclosure for one or more cameras and other optical elements (e.g., lenses, mirrors, etc.) and electrical elements (e.g., cables, circuit boards, etc.) therein. The horizontal housing 120 may include a structure that provides for one or more camera fields-of-view (through a horizontal window 121) within a generally vertical plane across the read zone of the data reader 100. The horizontal structure provides an enclosure for one or more cameras and other optical elements (e.g., lenses, mirrors, etc.) and electrical elements (e.g., cables, circuit boards, etc.) therein. Thus, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field-of-view may be physically located within the vertical structure and vice versa. It should be understood that higher angled orientations may be utilized if capable of performing the same or similar functionality as described herein. For example, if a higher relative angle exists, the optics may be configured and oriented to perform the same or similar functionality for scanning and the vertical housing 110 may be configured to support items placed in the same or similar manner on the horizontal housing 120 and supported by the vertical housing 110 albeit having a higher angular orientation.

The data reader 100 may also include a top-down reader (TDR) 150 connected to the data reader 100. The TDR 150 may include a head 152 that includes one or more imagers therein, and an elongate stand 154 that extends downward to provide a support and connection to the base scanner unit. The stand 154 may include a relatively narrow neck to accommodate cables (e.g., power, data, etc.) connecting the components within the head 152 of the TDR 150.

The imager(s) within the TDR 150 typically provide a generally close overhead (angled) view of the read zone to provide a top view of a product, whereas internal cameras may be better suited for capturing images of the bottom and/or sides of the object within the read zone. The vertical housing 110 may be at different heights depending on the components housed therein. Thus, a vertical housing with a lower profile form factor may be particularly well-suited to include the TDR 150 as an add-on to the data reader 100. However, a TDR 150 may also be coupled to the data reader 100 of FIG. 1 having a taller bonnet. The height of the stand 154 of the TDR 150 may be extended to accommodate a taller bonnet.

Some embodiments may include additional TDRs such as on the other side of the bonnet to provide another top view of the read zone. Thus, some embodiments may include one or more TDRs for data readers having different sized bonnets. It is also recognized that some embodiments may include single plane data readers such that certain features described herein are wholly located within a single plane housing (e.g., horizontal), which may further be coupled to one or more TDRs.

Different configurations and details regarding the construction and components of a fixed retail scanner are contemplated. For example, additional features and configurations of devices are described in the following patents and patent applications: U.S. Pat. No. 8,430,318, issued Apr. 30, 2013, and entitled "SYSTEM AND METHOD FOR DATA READING WITH LOW PROFILE ARRANGEMENT," U.S. Pat. No. 9,004,359, issued Apr. 14, 2015, entitled "OPTICAL SCANNER WITH TOP DOWN READER," U.S. Pat. No. 9,305,198, issued Apr. 5, 2016, entitled "IMAGING READER WITH IMPROVED ILLUMINATION," U.S. Pat. No. 10,049,247, issued Aug. 14, 2018, entitled "OPTIMIZATION OF IMAGE FRAME MANAGEMENT IN A SWEEP-STYLE OPTICAL CODE DATA READE," U.S. Pat. No. 10,248,896, issued Apr. 2, 2019, and entitled "DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY," and U.S. Patent Application Publication No. 2020/0125812, filed Dec. 2, 2019, and entitled "DATA COLLECTION SYSTEMS AND METHODS TO CAPTURE IMAGERS OF AND DECODE INFORMATION FROM MACHINE-READABLE SYMBOLS," U.S. Provisional Patent Application Ser. No. 63/293,596, filed Dec. 23, 2021, and entitled "FIXED RETAIL SCANNER WITH ON-BOARD ARTIFICIAL INTELLIGENCE (AI) ACCELERATOR MODULE AND RELATED METHODS," and U.S. Provisional Patent Application Ser. No. 63/293,563, filed Dec. 23, 2021, and entitled "FIXED RETAIL SCANNER WITH MULTI-PORT NETWORK SWITCH AND RELATED METHODS," the disclosure of each of which is incorporated by reference in their entirety. Such fixed retail scanners may be incorporated within assisted checkout stations having a clerk assisting a customer, while some embodiments include self-checkout stations in which the customer is the primary operator of the device. Such components and features may be employed in combination with those described herein.

Figure 2:
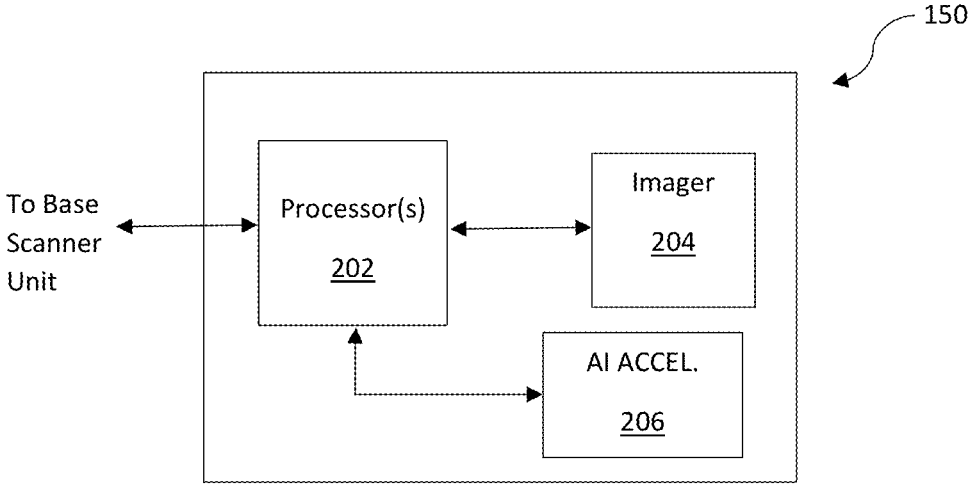
FIG. 2 is a simplified block diagram for the top-down reader according to an embodiment of the disclosure.

FIG. 2 is a simplified block diagram for the TDR 150 according to an embodiment of the disclosure. The TDR 150 may include a processor 202 that couples to an imager 204 (e.g., color and/or monochrome depending on application). The processor 202 may include one or more processors that perform different functions, such as control, formatting, and/or certain analysis functionality, etc. In some embodiments, certain camera modules of the TDR 150 may have their own active illumination assembly (not shown) associated therewith that may be different than the illumination assemblies within the housing of the base scanner unit. The illumination assembly may be located on-board as shown or be provided at a separate location, which may still be within the camera module housing.

In some embodiments, the TDR 150 may also include an AI accelerator 206 on-board the camera module. In some embodiments, the AI accelerator 206 may be surface mounted directly on the PCB along with the processor 202 and the imager 204. The AI accelerator 206 of the camera module may perform operations, such as item identification, item validation, decoding, optical character recognition (OCR), or other analysis that may be offloaded from the processor 202 or performed before data is transmitted to the base scanner unit. Having the AI accelerator 206 directly on-board within TDR 150 may provide certain latency advantages.

Excess heat may be generated by the processor 202 and/or the AI accelerator 206 or other components within the head of the TDR 150. A heat management system may be disposed therein as a solution for heat management of heat generating components main PCB (e.g., high-powered CPU) of the TDR 150. Heat management of components within the head 152 of the TDR 150 may be difficult because of the limited volume within the head 152 to have a fan directly channel air on top of the CPU. In addition, the head 152 also acts as an optical cavity housing the imager in which contamination is particularly undesirable. Embodiments of the disclosure may include a heat pipe thermal system configured to transfer the heat from the source to another location where there is a spacious volume for a fan to cool the system down, keep the optical cavity free from circulating air to avoid contamination, and avoid using an external enclosure as a heat sink.

Figure 3:
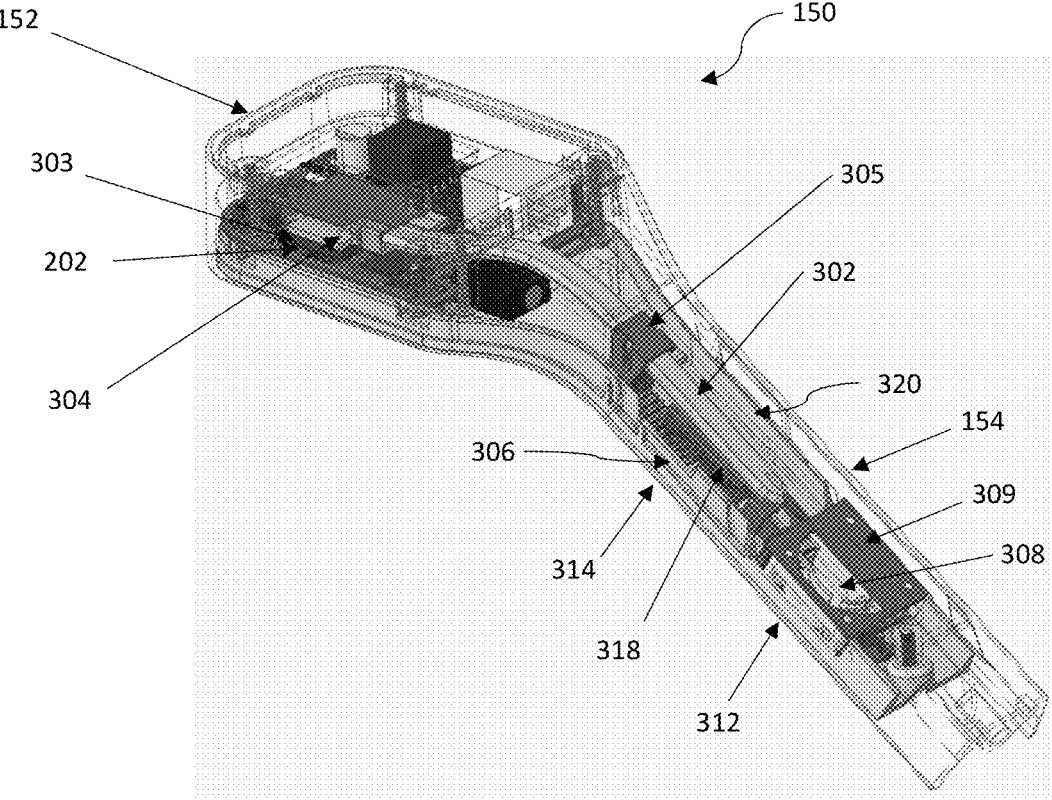
FIGS. 3-6 show different views of the heat management system of the top-down reader according to embodiments of the disclosure.
Figure 4:
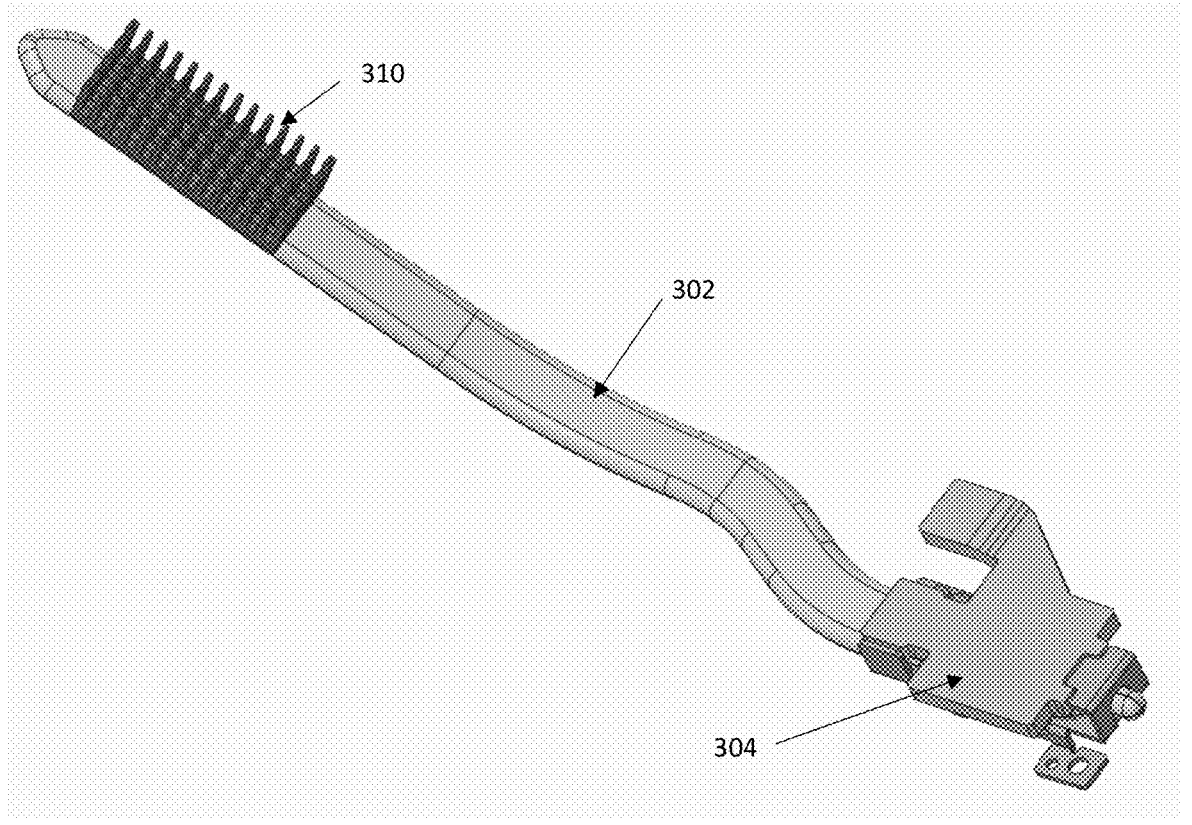
Figure 5:
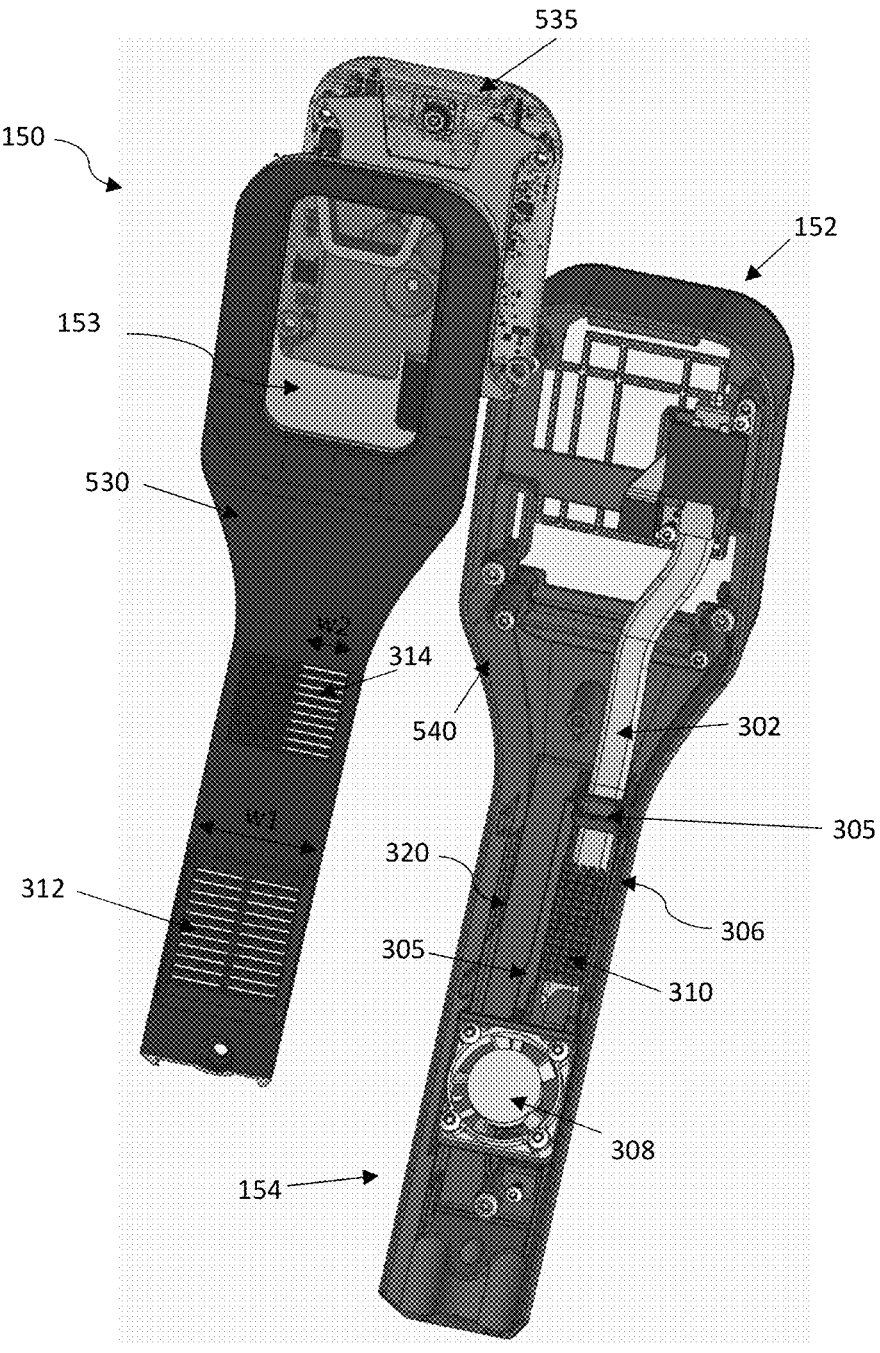
Figure 6:
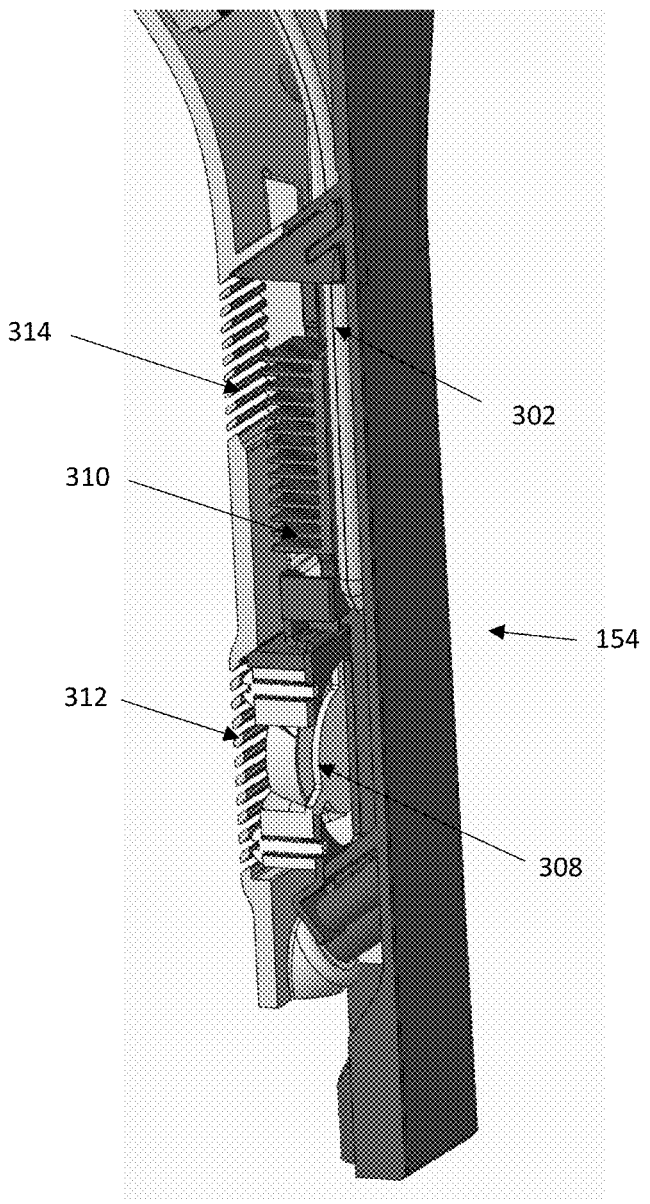

FIGS. 3-6 show different views of the heat management system of the TDR 150 according to embodiments of the disclosure. The heat management system may include a heat pipe 302 that draws heat away from the processor within the head 152 and into the stand 154 while still maintaining a sealed optical cavity for the imaging components within the head 152 of the TDR 150. FIG. 3 is a perspective view of the top portion of the TDR 150. FIG. 4 is an isolate view of the heat pipe structure described below. FIG. 5 is an exploded view of the TDR 150 viewed from the underside view where the window 153 is located through which the imager views the read zone. FIG. 6 is a zoomed in, cross sectional, view isolating the features of the heat pipe and air cavity within the stand 154. In these views, certain components have been removed and/or made transparent for clarity of describing another embodiment of the heat management system within the TDR 150.

Referring specifically to FIG. 3, the housing of the TDR 150 is depicted as transparent to show internal components of the TDR 150 and its heat management system. The PCB of the TDR 150 is disposed within the head 152, which has mounted thereon the processor, imager, and other components forming a camera module that connects to the base scanner unit via cables (e.g., power, data, etc.). The stand 154 may be divided into an air chamber 318 and a cabling path 320 having a wall therebetween. The air chamber 318 accommodates at least a portion of the heat management system (e.g., a portion of the heat pipe 302, fan 308, heat exchanger 310) in a manner that is sealed off from the head 152 of the TDR 150. An airflow seal 305 provides the seal between the air chamber 318 and the head 152 that contains the optical components for the TDR 150. Providing the fan with a sealed air chamber 306 within the stand 154 portion of the TDR 150 may reduce contamination that may be caused by fan circulated air in the optical cavity. The cabling path 320 is not sealed off from the head 152 and accommodates the cabling to pass from the head 152 of the TDR 150 to the scanner base unit.

The heat pipe 302 is thermally coupled with a heat generating component (e.g., a TDR processor) mounted on the PCB disposed within the head 152 and extends across an area within the housing of the TDR 150 to an air chamber 306 defined within the stand 154 of the TDR 150. The heat pipe 702 may be an elongate heat transfer device having heat conductivity of at least 500 W/m-K, which is greater than solid metals conventionally used in heat sink applications (e.g., copper (390 W/m-K) or aluminum (200 W/m-K)). In some embodiments, the heat conductivity may range from 1,500 to 50,000 or up to 100,000 W/m-K. Some applications may have higher ranges. Heat pipes typically employ a phase transition (e.g., liquid to vapor) within the heat pipe to transfer heat from an evaporator region to a condenser region. Some heat pipes may include a plurality of smaller heat pipes running in parallel.

The air chamber 306 may be located on a side portion of the stand 154 that is neighboring a cabling path 320 within the stand 154. The air chamber 306 may be defined by the side walls, top/bottom walls, and a back wall with a front opening for the heat pipe 302 to enter from the head region 152. The side of the enclosure for the stand 154 may be one of the side walls defining the air chamber 306. Another internal wall extending longitudinally within the internal area of the stand 154 may be the other side wall defining the air chamber. This internal wall may divide the air chamber 306 and the cabling path 320. A back wall may be disposed at the edge of the fan 308 in order to direct airflow forward toward the exhaust vents 314.

A first end of the heat pipe 302 may be coupled to a thermal pad 303 via an evaporator 304 to provide a heat conductive connection to the TDR processor 202. The evaporator 304 may include a heat plate formed from a metal material (e.g., copper, aluminum, etc.) The heat pipe 302 pass through a wall of the air chamber 306 to draw heat away from the processor 202 to the air chamber 306. The air chamber 306 may be a defined area (void) having walls that separate the space from other components located within the TDR 150 including being separated from the head 152 (containing the optical components) and the portion of the stand 154 for the cabling path 320 (for routing one or more cables between the TDR 150 and the base scanner). For example, an Ethernet cable may be connected to provide power and a data path to the TDR 150 that is routed through the cabling path 320 in the stand 154 and past the air chamber 306.

A second end of the heat pipe 302 may be coupled (e.g., soldered) to a heat exchanger 310 at the condenser end of the heat pipe 302. The heat exchanger 310 may formed from a heat conductive material (e.g., copper, aluminum, etc.), which may also include fins to provide additional heat sink capability. In some embodiments, the heat exchanger 310 may include multiple sets of fins coupled to the heat pipe 302. In order to accommodate the shape of the TDR 150, the heat pipe 302 may be shaped (e.g., bent) around the neck region to extend from the head 152 and into the stand 154.

An airflow seal 305 may be disposed at the interface between the air chamber 306 and the head 152 in order to contain the airflow within the air chamber 306, where the heat has been drawn away from the TDR processor 202. The airflow seal 305 may also extend along the internal wall separating the air chamber 306 and the cabling path 320 to provide a seal therebetween that contains airflow to within the air chamber 306. Thus, the airflow seal 305 may combine with the defining features of the air chamber 306 to provide a sealed air chamber. As a result, dust and other external contaminants may be kept outside of the region of the original heat generating source (where optical components are also located). The airflow seal 305 may be a rubber material (e.g., a rubber gasket). In some embodiments the airflow seal 305 may also extend along an interface of the fan 308. The air flow seal 305 may be a single component that extends along these interfaces or may be multiple parts that perform such an effect.

In some embodiments, a fan 308 may be disposed on a first end of the air chamber 306 and the heat exchanger 310 may be disposed on a second end of the air chamber 306. In some embodiments, the fan 308 may be on the end of the air chamber 306 that is opposite the insertion point (where the airflow seal 305 is located) of the heat pipe 302 while the heat exchanger 310 may be located on the end that is proximate the insertion point of the heat pipe 302. The fan 308 may draw air from an inlet air vent 312 formed in the wall of the housing of the TDR 150 to create an air flow through the air chamber 306 to the heat exchanger 310 to be expelled out the back of an exhaust air vent 314 formed in another portion of the wall of the TDR housing. As a result, the airflow may cool the connected heat generating component (e.g., switch processor) from within a sealed compartment (i.e., sealed air chamber) of the stand 154 rather than where the component resides within the head 152 of the TDR 150. The fan 308 may include a temperature regulator to determine when to operate as needed rather than running continuously. In some operational situations, the dissipation properties of the heat pipe 302 into the air chamber 306 may be sufficient without operation of the fan 308.

In some embodiments, a back plate 309 (see FIG. 3) may be included with the fan 308 that at least partially blocks a portion of the fan 308 within the stand 154. In particular, the back plate 309 may generally align with the sealed air chamber 306 with a void region aligns with the sealed air chamber 306 and a solid region that aligns with the cabling path 320. As a result, the solid region of the back plate 309 may block air flow from the fan from entering the cabling path 320 and direct the air to flow through primarily through the sealed air chamber 306. This approach may be preferred when the fan 308 is larger than the area of the sealed air chamber 306 such that the fan 308 may not be contained entirely within the sealed air chamber 306. As a result, a larger fan with a larger air volume may be used to generate airflow at a higher speed than if a smaller fan is used that is able to be entirely contained within the sealed air chamber 306. Of course, some embodiments may include a smaller fan that is entirely contained within the sealed air chamber 306.

In addition, it is noted that the air vents 312, 314 may be different sizes (see FIG. 5). For example, the inlet air vent 312 may be approximately the dimensions of the fan 308 to accommodate a full volume of external air to flow therein. As an example, the first width (w1) of the inlet air vents 312 may be approximately the width of the fan 308, which in this example is also approximately the width of the stand 154. The exhaust air vents 314 may have a second width (w2) that is approximately the width of the sealed air chamber 306 to accommodate the volume of air to be expelled therefrom. In this example, the second width (w2) of the exhaust air vents 314 is approximately one half of the width of the stand 154. Having exhaust air vents 314 to be more limited in width to that of the sealed air cavity 306 may block external contaminants or airflow from entering the cabling path 320. It is noted that the exhaust air vents 314 shown in FIG. 5 has a dark region next to it which is a solid region that is merely for cosmetic purposes to appear more symmetrical to the inlet air vents 312 even if such solid region does not function as an air vent.

By employing the heat pipe 302 structure, using the heat pipe 302 may be thermally insulated from the housing frame of the TDR 150 and using the frame for heat dissipation may not be required. External surfaces of the TDR housing may be thermally isolated from the heat management system and, therefore, be cooler and closer to ambient temperatures. As a result, the TDR housing may be formed of a plastic material instead of metal materials. In addition, the heat sink function may be separated from the internal mounting structures for the PCB to the housing. Likewise, the mounting structures for the PCB of the TDR 150 may also be formed of a plastic material. Plastic materials may be relatively lighter materials and allow for exterior surfaces to be kept at lower temperatures.

The position and orientation of the air chamber 306, air vents 312, 314, fan 308, and/or heat exchanger 310 may be changed to other arrangements depending on the layout of the TDR 150. As shown particularly in FIG. 5, the housing of the TDR 150 may have a front enclosure 530 and a back enclosure 540 that couple together when forming the housing for the internal components of the TDR 150. The air vents 312, 314 may be formed in different regions of the front enclosure 530 to create the air flow through the sealed air chamber 306 within the stand 154. In some embodiments, the air vents 312, 314 may be formed in the back enclosure 540 to create the air flow. In yet other embodiments, one air vent (e.g., inlet 312 or exhaust 314) may be formed in the front enclosure 530 and the other air vent (e.g., inlet 312 or exhaust 314) may be formed in the back enclosure 540. In some embodiments, the front enclosure 530 and the back enclosure 540 may be integrally formed (e.g., as a single structure) such that they are not separable, while other embodiments may include as multiple structural portions other than the two portions shown in these examples. Thus, air flow may occur from front-to-front, back-to-back, back-to-front, front-to-back, or other arrangements (e.g., one or more vents in the sides of the stand).

The previous description is of various preferred embodiments for implementing the disclosure, and the scope of the invention should not necessarily be limited by this description. The scope of the present invention is instead defined by the claims.

What is claimed:

1. A fixed retail scanner, comprising:
   a scanner base unit comprising one or more imagers to view a read zone; and
   a top-down reader (TDR) including:
      a head including an optical cavity therein housing a printed circuit board including one or more processors and optical components disposed therein; and
      an elongate stand attached to the head and coupled with the scanner base unit extending in a vertical direction such that the optical components within the head are oriented toward the read zone from a top-down perspective, the elongate stand including a sealed air chamber that is separated from the optical cavity by an airflow seal at an interface therebetween;
      a heat management system including a heat pipe having a first end disposed within the head and extending into the sealed air chamber within the elongate stand to dissipate heat from the one or more processors into the sealed air chamber, wherein the heat pipe is configured to employ a phase transition therein to transfer heat from an evaporator region to a condenser region.

2. A fixed retail scanner comprising:
   a scanner base unit comprising one or more imagers to view a read zone; and
   a top-down reader (TDR) having a head and an elongate stand operably coupled to the scanner base unit, the top-down reader including:
      a printed circuit board including one or more processors and optical components disposed within the head of the top-down reader; and a heat management system including:

a heat pipe having a first end disposed within the head and extending into a sealed air chamber within the elongate stand to dissipate heat from the one or more processors into the sealed air chamber;

an evaporator region at a first end of the heat pipe including a heat plate coupled to the one or more processors; and a condenser region at a second end of the heat pipe including a heat exchanger disposed within the sealed air chamber.

3. The fixed retail scanner of claim 2, wherein the heat management system further includes a fan disposed within the air chamber, wherein the fan is configured to create air flow across the condenser region including a heat exchanger.

4. The fixed retail scanner of claim 3, further comprising air vents formed in a frame of the TDR housing such that air is pulled from outside of the TDR through an inlet air vent through the sealed air chamber and out of an exhaust air vent.

5. The fixed retail scanner of claim 4, wherein the inlet air vent and the exhaust air vent are formed in a front enclosure of the TDR.

6. The fixed retail scanner of claim 5, wherein the front enclosure is a separate portion from a back enclosure of the TDR.

7. The fixed retail scanner of claim 5, wherein the front enclosure defines an area for a window within the head of the TDR.

8. The fixed retail scanner of claim 5, wherein the front enclosure is integrally formed with a back enclosure of the TDR.

9. The fixed retail scanner of claim 4, wherein the inlet air vent and the exhaust air vent are formed in a back enclosure of the TDR.

10. The fixed retail scanner of claim 4, wherein one of the inlet air vent or the exhaust air vent is formed in a front enclosure of the TDR and the other of the inlet air vent or the exhaust air vent is formed in a back enclosure of the TDR.

11. The fixed retail scanner of claim 4, wherein at least one of the inlet air vent or the exhaust air vent is formed in a side region of the elongate stand of the TDR.

12. The fixed retail scanner of claim 1, wherein the elongate stand includes a cabling path that runs parallel with the sealed air chamber having a wall therebetween within the elongate stand, the cabling path accommodating one or more cables to connect the TDR with the base scanner unit.

13. The fixed retail scanner of claim 1, wherein a housing frame of the TDR is formed from a plastic material.

14. The fixed retail scanner of claim 1, wherein the heat pipe is thermally coupled to the one or more processors within the head, and to a heat exchanger disposed within the sealed air chamber.

15. The fixed retail scanner of claim 1, further comprising a fan disposed within the sealed air chamber configured to create an airflow through the sealed air chamber through air vents formed in the stand.

16. A fixed retail scanner comprising:

a scanner base unit comprising one or more imagers to view a read zone; and a top-down reader (TDR) having a head and an elongate stand operably coupled to the scanner base unit, the top-down reader including:

a printed circuit board including one or more processors and optical components disposed within the head of the top-down reader; and a heat management system including:

a heat pipe having a first end disposed within the head and extending into a sealed air chamber within the elongate stand to dissipate heat from the one or more processors into the sealed air chamber, wherein the elongate stand region includes an internal cabling path parallel with the sealed air chamber.

17. The fixed retail scanner of claim 1, wherein the heat pipe includes a plurality of heat pipes running in parallel with each other.

18. The fixed retail scanner of claim 1, wherein the heat pipe exhibits a conductivity in a range of at least 500 W/m-K up to 100,000 W/m-K.

* * * * *